(12) United States Patent
Bakalash et al.

(10) Patent No.: US 8,629,877 B2
(45) Date of Patent: *Jan. 14, 2014

(54) METHOD OF AND SYSTEM FOR TIME-DIVISION BASED PARALLELIZATION OF GRAPHICS PROCESSING UNITS (GPUS) EMPLOYING A HARDWARE HUB WITH ROUTER INTERFACED BETWEEN THE CPU AND THE GPUS FOR THE TRANSFER OF GEOMETRIC DATA AND GRAPHICS COMMANDS AND RENDERED PIXEL DATA WITHIN THE SYSTEM

(75) Inventors: Reuven Bakalash, Shdema (IL); Offir Remez, Hod HaSharon (IL); Gigy Bar-Or, Kochav Yair (IL); Efi Fogel, Tel Aviv (IL); Amir Shaham, Givat Shmuel (IL)

(73) Assignee: Lucid Information Technology, Ltd., Kfar Netter (IL)

( * ) Notice: Subject to any disclaimer, the term of this patent is extended or adjusted under 35 U.S.C. 154(b) by 478 days.

This patent is subject to a terminal disclaimer.

(21) Appl. No.: 11/977,155

(22) Filed: Oct. 23, 2007

(65) Prior Publication Data

US 2008/0165196 A1      Jul. 10, 2008

Related U.S. Application Data

(63) Continuation of application No. 10/579,682, filed as application No. PCT/IL2004/001069 on Nov. 19, 2004, now Pat. No. 7,808,499.

(60) Provisional application No. 60/523,084, filed on Nov. 19, 2003, provisional application No. 60/523,102, filed on Nov. 19, 2003.

(51) Int. Cl.
*G06F 15/80* (2006.01)
*G06F 13/14* (2006.01)

(52) U.S. Cl.
USPC .......................................... 345/505; 345/520

(58) Field of Classification Search
USPC ........................ 345/502–506, 419, 519, 520
See application file for complete search history.

(56) References Cited

U.S. PATENT DOCUMENTS 5,687,357 A      11/1997   Priem
(Continued)

FOREIGN PATENT DOCUMENTS

JP          2-176980           7/1993

OTHER PUBLICATIONS

Powerpoint presentation entitled, "Go Multiple" by Dennis Yang, Conference Platform, 2007, 11 pages.
(Continued)

*Primary Examiner* — Hau Nguyen
(74) *Attorney, Agent, or Firm* — Eitan, Mehulal & Sadot

(57) ABSTRACT

A method of dynamic load-balancing in a PC-based computing system employing a multiple GPU-based graphics pipeline architecture supporting multiple modes of GPU parallelization. During the execution of the graphics application, the stream of geometrical data and said graphics commands is analyzed, and the mode of parallelization of the GPUs during each frame, is determined using results of the analysis of the stream of geometrical data and graphics commands, and one or more policies for determining the mode of parallelization. The stream of geometrical data and graphic commands is distributed to the GPUs according to the determined mode of parallelization. During the generation of each frame, one or more of GPUs are used to process the stream of geometrical data and graphic commands, or a portion thereof, while operating in the parallelization mode, so as to generate pixel data corresponding to at least a portion of an image of 3D object. The pixel data output is transferred from one or more of the GPUs and composing a frame of pixel data, representative of the image of the 3D object. The frame of pixel data is displayed on a display surface of the PC-based computing system.

10 Claims, 9 Drawing Sheets

(56) References Cited

U.S. PATENT DOCUMENTS

| | | | |
|---|---|---|---|
| 5,740,464 A | 4/1998 | Priem et al. | |
| 5,754,866 A | 5/1998 | Priem | |
| 5,758,182 A | 5/1998 | Rosenthal et al. | |
| 5,909,595 A | 6/1999 | Rosenthal et al. | |
| 6,169,553 B1 | 1/2001 | Fuller et al. | |
| 6,181,352 B1 | 1/2001 | Kirk et al. | |
| 6,182,196 B1 | 1/2001 | DeRoo | |
| 6,184,908 B1 | 2/2001 | Chan et al. | |
| 6,188,412 B1 | 2/2001 | Morein | |
| 6,201,545 B1 | 3/2001 | Wong et al. | |
| 6,288,418 B1 | 9/2001 | Reed et al. | |
| 6,333,744 B1 | 12/2001 | Kirk et al. | |
| 6,337,686 B2 | 1/2002 | Wong et al. | |
| 6,352,479 B1 | 3/2002 | Sparks, II | |
| 6,415,345 B1 | 7/2002 | Wu et al. | |
| 6,442,656 B1 | 8/2002 | Alasti et al. | |
| 6,462,737 B2 | 10/2002 | Lindholm et al. | |
| 6,469,703 B1 | 10/2002 | Aleksic et al. | |
| 6,473,086 B1 | 10/2002 | Morein et al. | |
| 6,473,089 B1 | 10/2002 | Wei et al. | |
| 6,477,687 B1 | 11/2002 | Thomas | |
| 6,492,987 B1 | 12/2002 | Morein | |
| 6,496,404 B1 | 12/2002 | Fiedler et al. | |
| 6,502,173 B1 | 12/2002 | Aleksic et al. | |
| 6,529,198 B1 * | 3/2003 | Miyauchi | 345/505 |
| 6,532,013 B1 | 3/2003 | Papakipos et al. | |
| 6,532,525 B1 | 3/2003 | Aleksic et al. | |
| 6,535,209 B1 | 3/2003 | Abdalla et al. | |
| 6,542,971 B1 | 4/2003 | Reed | |
| 6,577,309 B2 | 6/2003 | Lindholm et al. | |
| 6,577,320 B1 | 6/2003 | Kirk | |
| 6,593,923 B1 | 7/2003 | Donovan et al. | |
| 6,633,296 B1 | 10/2003 | Laksono et al. | |
| 6,636,212 B1 | 10/2003 | Zhu | |
| 6,636,215 B1 | 10/2003 | Greene | |
| 6,646,639 B1 | 11/2003 | Greene et al. | |
| 6,650,330 B2 | 11/2003 | Lindholm et al. | |
| 6,650,331 B2 | 11/2003 | Lindholm et al. | |
| 6,657,635 B1 | 12/2003 | Hutchins et al. | |
| 6,662,257 B1 | 12/2003 | Caruk et al. | |
| 6,664,960 B2 | 12/2003 | Goel et al. | |
| 6,664,963 B1 | 12/2003 | Zatz | |
| 6,670,958 B1 | 12/2003 | Aleksic et al. | |
| 6,677,953 B1 | 1/2004 | Twardowski et al. | |
| 6,690,372 B2 | 2/2004 | Donovan et al. | |
| 6,691,180 B2 | 2/2004 | Priem et al. | |
| 6,700,583 B2 | 3/2004 | Fowler et al. | |
| 6,704,025 B1 | 3/2004 | Bastos et al. | |
| 6,724,394 B1 | 4/2004 | Zatz et al. | |
| 6,725,457 B1 | 4/2004 | Priem et al. | |
| 6,728,820 B1 | 4/2004 | Brian et al. | |
| 6,731,282 B2 | 5/2004 | Stoll et al. | |
| 6,731,298 B1 | 5/2004 | Moreton et al. | |
| 6,734,861 B1 | 5/2004 | Van Dyke et al. | |
| 6,734,874 B2 | 5/2004 | Lindholm et al. | |
| 6,744,433 B1 | 6/2004 | Bastos et al. | |
| 6,747,654 B1 | 6/2004 | Laksono et al. | |
| 6,753,878 B1 | 6/2004 | Heirich et al. | |
| 6,774,895 B1 | 8/2004 | Papakipos et al. | |
| 6,778,176 B2 | 8/2004 | Lindholm et al. | |
| 6,778,181 B1 | 8/2004 | Kilgariff et al. | |
| 6,778,189 B1 | 8/2004 | Kilgard | |
| 6,779,069 B1 | 8/2004 | Treichler et al. | |
| 6,789,154 B1 | 9/2004 | Lee et al. | |
| 6,797,998 B2 | 9/2004 | Dewey et al. | |
| 6,812,927 B1 | 11/2004 | Cutler et al. | |
| 6,825,843 B2 | 11/2004 | Allen et al. | |
| 6,828,980 B1 | 12/2004 | Moreton et al. | |
| 6,828,987 B2 | 12/2004 | Swan | |
| 6,831,652 B1 | 12/2004 | Orr | |
| 6,856,320 B1 | 2/2005 | Rubinstein et al. | |
| 6,864,893 B2 | 3/2005 | Zatz | |
| 6,870,540 B1 | 3/2005 | Lindholm et al. | |
| 6,876,362 B1 | 4/2005 | Newhall, Jr. et al. | |
| 6,894,687 B1 | 5/2005 | Kilgard et al. | |
| 6,894,689 B1 | 5/2005 | Greene et al. | |
| 6,900,810 B1 | 5/2005 | Moreton et al. | |
| 6,919,896 B2 * | 7/2005 | Sasaki et al. | 345/505 |
| 6,938,176 B1 | 8/2005 | Alben et al. | |
| 6,940,515 B1 | 9/2005 | Moreton et al. | |
| 6,947,047 B1 | 9/2005 | Moy et al. | |
| 6,947,865 B1 | 9/2005 | Mimberg et al. | |
| 6,952,206 B1 | 10/2005 | Craighead | |
| 6,956,579 B1 | 10/2005 | Diard et al. | |
| 6,959,110 B1 | 10/2005 | Danskin et al. | |
| 6,961,057 B1 | 11/2005 | Van Dyke et al. | |
| 6,975,319 B1 | 12/2005 | Donovan et al. | |
| 6,980,209 B1 | 12/2005 | Donham et al. | |
| 6,982,718 B2 | 1/2006 | Kilgard et al. | |
| 6,985,152 B2 | 1/2006 | Rubinstein et al. | |
| 6,989,840 B1 | 1/2006 | Everitt et al. | |
| 6,992,667 B2 | 1/2006 | Lindholm et al. | |
| 6,995,767 B1 | 2/2006 | Donovan et al. | |
| 6,999,076 B2 | 2/2006 | Morein | |
| 7,002,588 B1 | 2/2006 | Lindholm et al. | |
| 7,015,915 B1 | 3/2006 | Diard | |
| 7,023,437 B1 | 4/2006 | Voorhies et al. | |
| 7,027,972 B1 | 4/2006 | Lee | |
| 7,038,678 B2 | 5/2006 | Bunnell | |
| 7,038,685 B1 | 5/2006 | Lindholm | |
| 7,038,692 B1 | 5/2006 | Priem et al. | |
| 7,053,901 B2 | 5/2006 | Huang et al. | |
| 7,064,763 B2 | 6/2006 | Lindholm et al. | |
| 7,068,272 B1 | 6/2006 | Voorhies et al. | |
| 7,068,278 B1 | 6/2006 | Williams et al. | |
| 7,075,541 B2 | 7/2006 | Diard | |
| 7,080,194 B1 | 7/2006 | Van Dyke | |
| 7,081,895 B2 | 7/2006 | Papakipos et al. | |
| 7,091,971 B2 | 8/2006 | Morein | |
| 7,095,414 B2 | 8/2006 | Lindholm et al. | |
| 7,098,922 B1 | 8/2006 | Bastos et al. | |
| 7,112,884 B2 | 9/2006 | Bruno | |
| 7,120,816 B2 | 10/2006 | Williams et al. | |
| 7,123,266 B2 | 10/2006 | Wei et al. | |
| 7,129,909 B1 | 10/2006 | Dong et al. | |
| 7,130,316 B2 | 10/2006 | Kovacevic | |
| 7,142,215 B1 | 11/2006 | Papakipos et al. | |
| 7,145,565 B2 | 12/2006 | Everitt et al. | |
| 7,170,513 B1 | 1/2007 | Voorhies et al. | |
| 7,170,515 B1 | 1/2007 | Zhu | |
| 7,224,359 B1 | 5/2007 | Papakipos et al. | |
| 7,248,261 B1 | 7/2007 | Hakura | |
| 7,253,818 B2 | 8/2007 | Wang et al. | |
| 7,289,125 B2 | 10/2007 | Diard et al. | |
| 7,543,101 B2 | 6/2009 | Aleksic et al. | |
| 7,545,380 B1 | 6/2009 | Diard et al. | |
| 7,613,346 B2 | 11/2009 | Hunkins et al. | |
| 7,616,207 B1 | 11/2009 | Diard et al. | |
| 7,663,632 B2 | 2/2010 | Callway | |
| 7,721,118 B1 | 5/2010 | Tamasi et al. | |
| 7,777,748 B2 | 8/2010 | Bakalash et al. | |
| 7,782,325 B2 * | 8/2010 | Gonzalez et al. | 345/505 |
| 7,796,129 B2 | 9/2010 | Bakalash et al. | |
| 7,796,130 B2 | 9/2010 | Bakalash et al. | |
| 7,800,610 B2 | 9/2010 | Bakalash et al. | |
| 7,800,611 B2 | 9/2010 | Bakalash et al. | |
| 7,800,619 B2 | 9/2010 | Bakalash et al. | |
| 7,808,499 B2 | 10/2010 | Bakalash et al. | |
| 7,808,504 B2 | 10/2010 | Bakalash et al. | |
| 7,812,844 B2 | 10/2010 | Bakalash et al. | |
| 7,812,845 B2 | 10/2010 | Bakalash et al. | |
| 7,812,846 B2 | 10/2010 | Bakalash et al. | |
| 7,834,880 B2 | 11/2010 | Bakalash et al. | |
| 7,843,457 B2 | 11/2010 | Bakalash et al. | |
| 7,940,274 B2 | 5/2011 | Bakalash et al. | |
| 7,944,450 B2 | 5/2011 | Bakalash et al. | |
| 7,961,194 B2 | 6/2011 | Bakalash et al. | |
| 8,085,273 B2 | 12/2011 | Bakalash et al. | |
| 2001/0029556 A1 | 10/2001 | Priem et al. | |
| 2002/0015055 A1 | 2/2002 | Foran | |
| 2002/0085007 A1 | 7/2002 | Nelson et al. | |
| 2002/0118308 A1 | 8/2002 | Dujmenovic | |
| 2002/0180740 A1 | 12/2002 | Lindholm et al. | |
| 2002/0196259 A1 | 12/2002 | Lindholm et al. | |

(56) References Cited

U.S. PATENT DOCUMENTS

| | | |
|---|---|---|
| 2003/0020720 A1 | 1/2003 | Lindholm et al. |
| 2003/0034975 A1 | 2/2003 | Lindholm et al. |
| 2003/0038808 A1 | 2/2003 | Lindholm et al. |
| 2003/0080959 A1 | 5/2003 | Morein |
| 2003/0103054 A1 | 6/2003 | Montrym et al. |
| 2003/0112245 A1 | 6/2003 | Lindholm et al. |
| 2003/0112246 A1 | 6/2003 | Lindholm et al. |
| 2003/0128197 A1 | 7/2003 | Turner et al. |
| 2003/0128216 A1 | 7/2003 | Walls et al. |
| 2003/0151606 A1 | 8/2003 | Morein |
| 2003/0164832 A1 | 9/2003 | Alcorn |
| 2003/0179220 A1 | 9/2003 | Dietrich, Jr. et al. |
| 2003/0189565 A1 | 10/2003 | Lindholm et al. |
| 2003/0212735 A1 | 11/2003 | Hicok et al. |
| 2004/0012600 A1 | 1/2004 | Deering et al. |
| 2004/0036159 A1 | 2/2004 | Bruno |
| 2004/0153778 A1 | 8/2004 | Cheng |
| 2004/0169651 A1 | 9/2004 | Everitt et al. |
| 2004/0179019 A1 | 9/2004 | Sabella et al. |
| 2004/0207618 A1 | 10/2004 | Williams et al. |
| 2004/0210788 A1 | 10/2004 | Williams et al. |
| 2005/0041031 A1 | 2/2005 | Diard |
| 2005/0081115 A1 | 4/2005 | Cheng et al. |
| 2005/0162437 A1 | 7/2005 | Morein et al. |
| 2005/0190190 A1 | 9/2005 | Diard et al. |
| 2005/0195186 A1 | 9/2005 | Mitchell et al. |
| 2005/0195187 A1 | 9/2005 | Seiler et al. |
| 2005/0206646 A1 | 9/2005 | Alcorn |
| 2005/0223124 A1 | 10/2005 | Reed |
| 2005/0225558 A1 | 10/2005 | Morein et al. |
| 2005/0237327 A1 | 10/2005 | Rubinstein et al. |
| 2005/0237329 A1 | 10/2005 | Rubinstein et al. |
| 2005/0243096 A1 | 11/2005 | Possley et al. |
| 2005/0243215 A1 | 11/2005 | Doswald et al. |
| 2005/0259103 A1 | 11/2005 | Kilgard et al. |
| 2005/0265064 A1 | 12/2005 | Ku et al. |
| 2005/0275760 A1 | 12/2005 | Gritz et al. |
| 2006/0005178 A1 | 1/2006 | Kilgard et al. |
| 2006/0028478 A1 | 2/2006 | Rubinstein et al. |
| 2006/0055695 A1 | 3/2006 | Abdalla et al. |
| 2006/0059494 A1 | 3/2006 | Wexler et al. |
| 2006/0101218 A1 | 5/2006 | Reed |
| 2006/0114260 A1 | 6/2006 | Diard |
| 2006/0119607 A1 | 6/2006 | Lindholm et al. |
| 2006/0120376 A1 | 6/2006 | Duncan et al. |
| 2006/0123142 A1 | 6/2006 | Duncan et al. |
| 2006/0202941 A1 | 9/2006 | Morein et al. |
| 2006/0208960 A1 | 9/2006 | Glen |
| 2006/0221086 A1 | 10/2006 | Diard |
| 2006/0221087 A1 | 10/2006 | Diard |
| 2006/0225061 A1 | 10/2006 | Ludwig et al. |
| 2006/0248241 A1 | 11/2006 | Danilak |
| 2006/0267987 A1 | 11/2006 | Litchmanov |
| 2006/0268005 A1 | 11/2006 | Hutchins et al. |
| 2006/0271713 A1 | 11/2006 | Xie et al. |
| 2006/0282604 A1 | 12/2006 | Temkine et al. |
| 2007/0159488 A1 | 7/2007 | Danskin et al. |
| 2007/0195099 A1 | 8/2007 | Diard et al. |

OTHER PUBLICATIONS

Scientific publication entitled, "Chromium; A Stream-Processing Framework for Interactive Rendering on Clusters" from Stanford University, Lawerence Livermore National Laboratory, and IBM T.J. Watson Research Center, 2007, 10 pages.

Scientific publication entitled "Hybrid Sort-First and Sort-Last Parallel Rendering With a Cluster of PCs" by Rudrajit Samanta et al., Princeton University, 12 pages, c. 2000.

* cited by examiner

METHOD OF AND SYSTEM FOR TIME-DIVISION BASED PARALLELIZATION OF GRAPHICS PROCESSING UNITS (GPUS) EMPLOYING A HARDWARE HUB WITH ROUTER INTERFACED BETWEEN THE CPU AND THE GPUS FOR THE TRANSFER OF GEOMETRIC DATA AND GRAPHICS COMMANDS AND RENDERED PIXEL DATA WITHIN THE SYSTEM

RELATED CASES

The Present application is a Continuation of application Ser. No. 10/579,682 now U.S. Pat. No. 7,808,499 which is a National Stage Entry of International Application No. PCT/IL2004/001069 filed Nov. 19, 2004, which is based on U.S. Provisional Application Nos. 60/523,084 filed Nov. 19, 2003, and 60/523,102 filed Nov. 19, 2003; wherein each said Application is commonly owned by LUCID INFORMATION TECHNOLOGY LTD., and incorporated herein by reference in its entirety, as if set forth fully herein.

BACKGROUND OF INVENTION

Field of the Invention

The present invention relates to a method and system for 3-D (three-dimensional) multiple graphic processing. More particularly, the invention relates to a method and system for improving the parallelization of image processing by Graphic Processing Units (GPUs), based on a unified framework of three parallelization methods, which are time division, image division and object division methods.

DEFINITIONS, ACRONYMS AND ABBREVIATIONS

Throughout this patent Specification, the following definitions are employed:

GPU: GPU (Graphic Processing Unit) like the CPU (Central Processing Unit), a GPU is a single-chip processor which is used primarily for computing 3-D functions. This includes tasks such as, lighting effects, object transformations, and 3-D motion. These are mathematically-intensive tasks, which otherwise, would put quite a strain on the CPU, but since the specialized GPU can handle most of the 3-D calculations, it helps the computer to perform these tasks more efficiently, and, of course, faster.

Polygon: Polygons in 3-D graphics are two-dimensional primitives, allowing generating and displaying of 3-D complex graphical objects. The polygons are the faces of the object and are composed from N vertices. Actually, a polygon is a closed plane figure, bounded by three or more line segments.

Frame Buffer: a Frame Buffer (FB) is a buffer that stores the contents of an image, pixel by pixel. Generally, the portion of memory is reserved for holding the complete bit-mapped image that is sent to the monitor, for display.

Typically the frame buffer is stored in the memory chips on the video adapter. In some instances, however, the video chipset is integrated into the motherboard design, and the frame buffer is stored in the general main memory.

Object compositing unit: performs re-composition of multiple three-dimensional rasters into final image. The merged data is resolved for the closest pixel to the viewer in 3-D space, based on the depth value of pixels. The new method, based on autonomous associative decision, allows the use of multiple GPUs for any frame complexity.

Display list: a Display List is a description of the 3-D scene through a list of graphic primitives, such as polygons and attributes. The display list provides intermediate image storage for quick image retrieval.

Vertex array: a Vertex Array is an array of vertices describing the 3-D scene.

A Vertex Array provides intermediate image storage for quick image retrieval.

Alpha blending: Alpha blending controls the way in which the graphic information is displayed, such as levels of transparency, or opacity.

BRIEF DESCRIPTION OF THE STATE OF THE ART

The three-dimensional graphic pipeline architecture breaks-down into segmented stages of CPU, Bus, GPU vertex processing and GPU fragment (pixel) processing. A given pipeline is only as strong as the weakest link of one of the above stages, thus the main bottleneck determines the overall throughput. Enhancing performance is all that is required for reducing or eliminating bottlenecks. The major bottleneck strongly depends on the application. Extreme cases are CAD-like (Computer Aided Design) applications, characterized by an abundance of polygons (vertices), vs. video-game applications having a small polygon count but intensive fragment activity (e.g., texturing). The first class suffers from vertex processing bottlenecks, while the second class suffers from fragment bottlenecks. Both are frequently jammed over the PC bus. Many applications have mixed characteristics, where bottlenecks may randomly alternate between extremes, on a single frame basis.

The only way to improve the performance of the GPU is by means of parallelizing multiple GPUs according to one of the bottleneck solving methods. There are two predominant methods for rendering graphic data with multiple GPUs. These methods include time division (time domain composition), in which each GPU renders the next successive frame, and image division (screen space composition), in which each GPU renders a subset of the pixels of each frame. The third one, much less popular, is the object division (polygon decomposition) method.

In the time division method each GPU renders the next successive frame. It has the disadvantage of having each GPU render an entire frame. Thus, the speed at which each frame is rendered is limited to the rendering rate of a single GPU. While multiple GPUs enable a higher frame rate, a delay can be imparted in the response time (latency) of the system to a user's input. This occurs because, while at any given time, only one GPU is engaged in displaying a rendered frame, each of the GPUs is in the process of rendering one of a series of frames in a sequence. To maintain the high frame rate, the system delays the user's input until the specific GPU, which first received the signal cycles through the sequence, is again engaged in displaying its rendered frame. In practical applications, this condition serves to limit the number of GPUs that are used in a system. With large data sets, there is another bottleneck, due to the fact that each GPU must be able to access all the data. This requires either maintaining multiple copy operations of large data sets or having possible conflicts in accessing the single copy operation.

The image division method splits the screen between N GPUs, such that each one displays 1/N of the image. The entire polygon set is transferred to each GPU for processing, however, the pixel processing is significantly reduced to the window size. Image division has no latency issues, but it has a similar bottleneck with large data sets, since each GPU must examine the entire database to determine which graphic elements fall within the portion of the screen allocated to said GPU. The image division method suits applications with intensive pixel processing.

The object division method is based on distribution of data subsets between multiple GPUs. The data subsets are rendered in the GPU pipeline, and converted to Frame Buffer (FB) of fragments (sub-image pixels). The multiple FB's sub-images have to be merged (composited) to generate the final image to be displayed. Object division delivers parallel rendering on the level of a single frame of very complex data consisting of large amount of polygons. The input data is decomposed in the polygon level and re-composed in the pixel level. A proprietary driver intelligently distributes data streams, which are generated by the application, between all GPUs. The rasters, generated by the GPUs, are composited into final raster, and moved to the display. The object division method well suits applications that need to render a vast amount of geometrical data. Typically, these are CAD, Digital Content Creation, and comparable visual simulation applications, considered as "viewers", meaning that the data has been pre-designed such that their three-dimensional positions in space are not under the interactive control of the user. However, the user does have interactive control over the viewer's position, the direction of view, and the scale of the graphic data. The user also may have control over the selection of a subset of the data and the method by which it is rendered. This includes manipulating the effects of image lighting, coloration, transparency and other visual characteristics of the underlying data.

In the above applications, the data tends to be very complex, as it usually consists of massive amount of geometrical entities at the display list or vertex array.

Thus, the construction time of a single frame tends to be very long (e.g., typically 0.5 sec for 20 million polygons), which in turn slows down the overall system performance.

Therefore, there is a need to provide a system which can guarantee the best system performance, while being exposed to high traffic over the PC (Personal Computer) Bus.

OBJECTS OF THE PRESENT INVENTION

Accordingly, it is an object of the present invention to amplify the strength of the GPU by means of parallelizing multiple GPUs.

It is another object of the present invention to provide a system, wherein the construction time of a single frame does not slow down the overall system response.

It is still another object of the present invention to provide a system and method, wherein the graphic pipeline bottlenecks of vertex processing and fragment processing are transparently and intelligently resolved.

It is still a further object of the present invention to provide a system and method that has high scalability and unlimited scene complexity.

It is still a further object of the present invention to provide a process overcoming difficulties that are imposed by the data decomposition, which is partition of data and graphic commands between GPUs.

It is still a further object of the present invention to provide a method and system for an intelligent decomposition of data and graphic commands, preserving the basic features of graphic libraries as state machines and complying with graphic standards.

Other objects and advantages of the invention will become apparent as the description proceeds.

SUMMARY OF THE INVENTION

The present invention is directed to a system for improving the parallelization of image processing, using one or more parallelization modes, wherein the image that is displayed on at least one computer screen by one or more Graphic Processing Units, which comprises: one or more software applications, for issuing graphic commands; one or more graphic libraries, for storing data used to implement the graphic commands; one or more Software Hub Drivers, for controlling a Hardware Hub, for interacting with the operation system of the computer and the graphic libraries, for performing real-time analysis of a data stream, from which frames of the image are generated, for determining the parallelization mode of each GPU, and for forwarding the data stream or a portion thereof to each GPU; one or more GPU Drivers, for allowing the GPUs to interact with the graphic libraries; and at least one I/O module for interconnecting between the Software module and the Hardware Hub, wherein, the Hardware Hub distributes between the GPUs, for each frame, graphic commands and the data stream or a portion thereof, according to their relative complexity within the image, and defines the complexity The Software Hub Driver also composites a graphics output for display, using the outputs obtained from at least one GPU, while alternating, whenever required, the parallelization mode for the each frame.

Parallelization is based on an object division mode or on an image division mode or on a time division mode or on any combination thereof. The hardware hub comprises a compositing unit for composing a complete frame from processed portions of the data stream. The hardware hub comprises a hub router for routing polygonal data, for routing a graphic command stream, for routing pixel data and for routing the results of composition, while operating in the object division mode or in the image division mode or in the time division mode or in any combination thereof. The hardware hub comprises a control unit for receiving commands from the Software Hub Driver within the I/O module. The hardware hub comprises a memory unit for storing intermediate processing results of one or more GPUs and data required for composition and transferring the processed data for display.

Preferably, the Software Hub Driver is capable of performing the following operations: interception of the graphic commands from the standard graphic library by means of the OS interface and utilities; forwarding and creating graphic commands to the GPU Driver by means of the OS interface and utilities; controlling the Hardware Hub, registry and installation operations by means of the OS interface and utilities: maintaining the consistency of graphic machine states across the GPUs, based on the input graphic commands stream, while using state monitoring; estimating the type of graphic load and overload in the executed application graphic context, while using application and graphic resources analysis; load estimation of the GPUs load balance based on graphic commands stream and time measurements, while using application and graphic resources analysis; adjusting the load distribution between GPUs according to feedback received from each GPU regarding the load balance, while using application and graphic resources analysis; performing manipulation in graphic functions according to the current parallelization mode; and controlling the distributed graphic functions, while modifying the graphic commands and the data stream according to the current parallelization mode.

The present invention is directed to a method for improving the parallelization of image processing, using one or more parallelization modes, wherein the image that is displayed on at least one computer screen by one or more Graphic Processing Units. Software applications are provided for issuing graphic command and graphic libraries are provided for storing data used to implement the graphic commands. A Software Hub Drivers is provided for controlling a Hardware Hub, for interacting with the operation system of the computer and the graphic libraries, for performing real-time analysis of a data stream, from which frames of the image are generated, for determining the parallelization mode of each GPU, and for forwarding the data stream or a portion thereof to each GPU. GPU Drivers are provided for allowing the GPUs to interact with the; graphic libraries and an I/O module is provided for interconnecting between the Software module and the Hardware Hub. Graphic commands and the data stream or a portion thereof are distributed between the GPUs for each frame by the Hardware Hub, according to their relative complexity within the image, wherein the complexity is defined by the Software Hub Driver. The Software Hub Driver also composites a graphics output for display, using the outputs obtained from at least one GPU, while alternating, whenever required, the parallelization mode for the each frame.

Whenever the parallelization mode is an Object division parallelization mode, the following steps are performed: for each frame, generating a stream of graphic operations and polygonal data; marking the polygonal data and graphic commands by means of the Software Hub Driver for distribution between multiple GPUs; sending the marked data to the Hardware Hub; distributing the marked data via the Hub Router to the multiple GPUs; rendering the data by means of GPUs; retrieving the data from the Frame Buffers and forwarding the retrieved data to the compositing unit via the Hub Router; compositing the content of the Frame Buffers into a single Frame Buffer; and forwarding the content of the single Frame Buffer to at least one designated GPU for display.

Whenever the parallelization mode is an Image division parallelization mode, the following steps are performed: subdividing the screen to portions and assigning different viewports to GPUs by means of the Software Hub Driver; moving the entire polygonal data and graphic commands to the Hub Router; transmitting the entire polygonal data and graphic commands to GPUs, wherein each GPU receives the same data; rendering the data by means of GPUs; forwarding a portion of the content stored in the Frame Buffers to compositing unit in Hardware Hub for the complete image creation; and forwarding the image to at least one designated GPU for display.

Whenever the parallelization mode is a Time division parallelization mode, the following steps are performed: forwarding to each one of the multiple GPUs the entire amount of polygons for rendering; redirecting the entire polygonal data and graphic commands by means of Software Hub Driver to all GPUs, while alternating between them; rendering the data by means of GPUs; transferring rendered data from at least one GPU via the Hub Router; and redirecting the resulting content of the Frame Buffer via Hub Router to at least one designated GPU for display.

The distribution of polygons between multiple GPUs is performed by distributing blocks of data between multiple GPUs and by testing each graphic operation for blocking mode, in which one or more parallelization modes are carried out, thereafter. The data is redirected in regular non-blocking path to at least one designated GPU, This process is repeated until a blocking operation is detected. Then GPUs are synchronized by performing a flush operation in order to terminate rendering and clean up the internal pipeline in each GPU; performing a composition operation for merging the contents of the Frame Buffers into a single Frame Buffer and by transmitting the single Frame Buffer back to all GPUs. Then the composited complete frame is terminated at all GPUs, except one or more designated GPUs, whenever a Swap operation is detected and displays the image by means of the one or more designated GPUs. the same data is processed by all GPUs, as long as the blocking mode is active and the Swap operation is not detected. Whenever the blocking mode is inactive, the designated data is further processed by multiple GPUs.

BRIEF DESCRIPTION OF THE DRAWINGS

For a more complete understanding of the present invention, the following Detailed Description of the Illustrative Embodiment should be read in conjunction with the accompanying Drawings, wherein.

Figure 1:
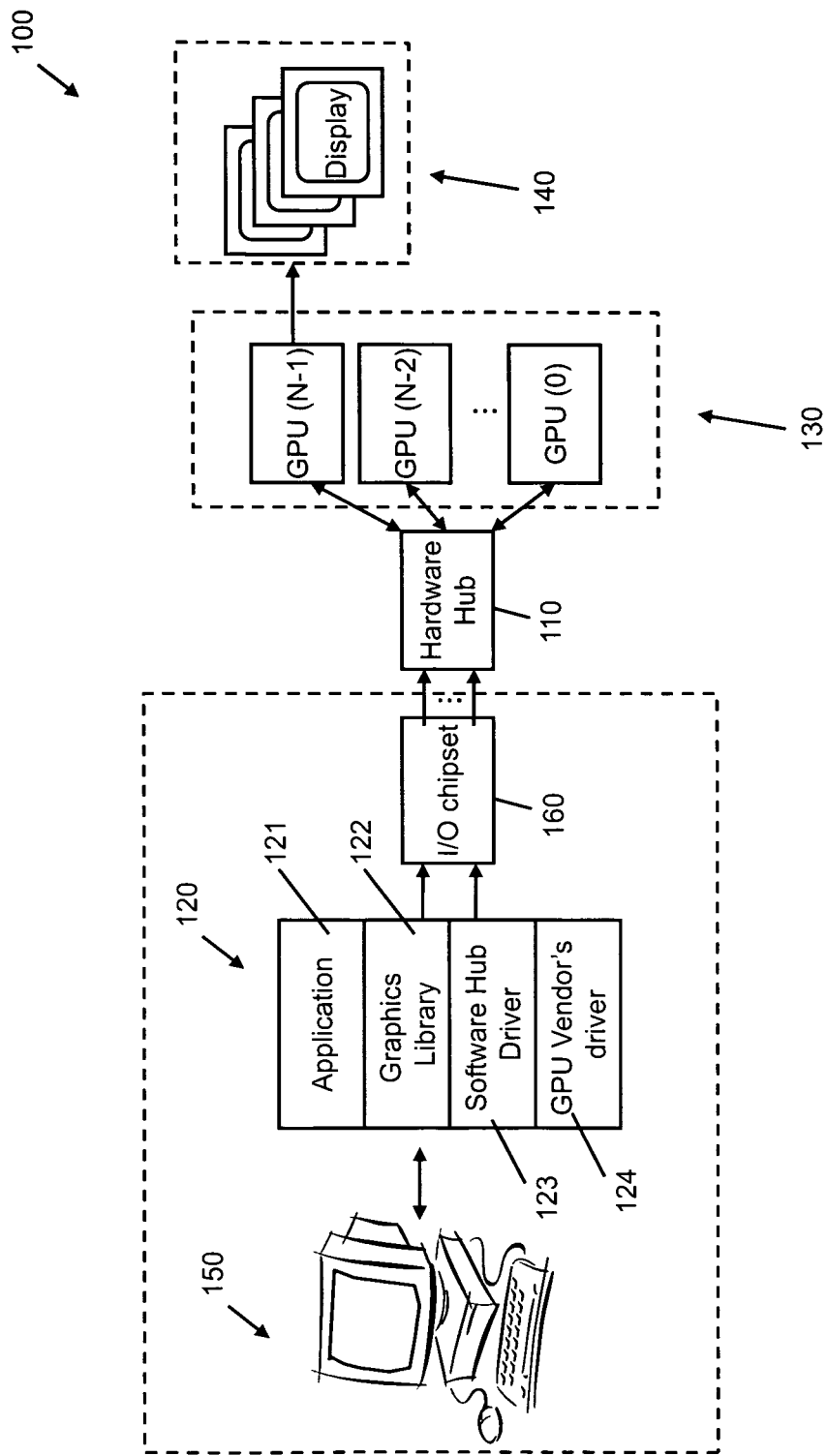
FIG. 1 is a block diagram of a multiple GPU architecture system, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated between the figures to indicate corresponding or analogous elements.

DETAILED DESCRIPTION OF THE PREFERRED EMBODIMENTS

The Multiple 3-D Graphic Pipeline

The current invention calls for the introduction of an extended PC graphic architecture including novel operational component, the 3-D pipeline Hub.

FIG. 1 presents multiple GPU architecture system 100, according to an embodiment of the present invention. The hub 110 is located in a unique position on the PC bus, between the CPU (Central Processing Unit) and a cluster of GPUs 130. The multiple graphic pipeline architecture, as described in FIG. 1, consists of Software Application 121, Graphic Library 122, Software Hub Driver 123, GPU Driver 124, Hardware Hub 110, cluster of GPUs 130, and display (s) 140.

Usually, one of the GPUs is designated as a display unit. It should be noted, that it is possible to have more than one display unit, or include a display unit directly inside the Hardware Hub. A display unit can drive multiple screens, as well.

The Hub mechanism consists of a Hardware Hub component 110, located on the PC bus between I/O (Input/Output) chipset 160, being a I/O module, and a cluster of GPUs 130, and a Software module comprising Software Hub Driver 123, executed by the PC.

The Hardware Hub 110 carries on at least the following action: distributes decomposed polygon stream and graphic commands between GPUs; composites graphics output for display according to different parallel modes; makes cache of data; and alternates modes of parallelism.

The Software Hub Driver 123, besides controlling the Hardware Hub 110, also carries on at least the following actions: interacts with the OS (Operation System) and graphic library, such as OpenGL, DirectX; performs real-time analysis of the data stream; determines the parallelization mode; and—decomposes the data and command stream.

One advantage of this method is that the unique location of the Hardware Hub 110 allows it to control the graphic pipeline, while being transparent to the application 121. The application 121, along with Graphic Library 122, such as OpenGL, keeps working as it was a single GPU.

Another advantage of this method is that the unique location of the Hardware Hub 110 allows it to control a graphic pipeline between the User Interface 150 and Display 140, while being transparent to the GPU. Each GPU of the cluster keeps working as if it is the only graphic processor hooked on the I/O chipset 160.

Still another advantage of this method is that the unique location of the Hardware Hub 110 allows it to control the graphic pipeline for different parallelization modes: image division mode, time division mode or object division mode.

A further advantage of this method is that the unique location of the Hardware Hub 110 allows it to sense in real-time the varying parameters of application's load, such as polygon count, texture volume, human interaction, and to intelligently decide and carry on the current optimal parallelization method.

It should be noted that according to all embodiments of the present invention, the display(s) 140 may be connected directly or indirectly to the Hardware Hub 110.

Figure 2:
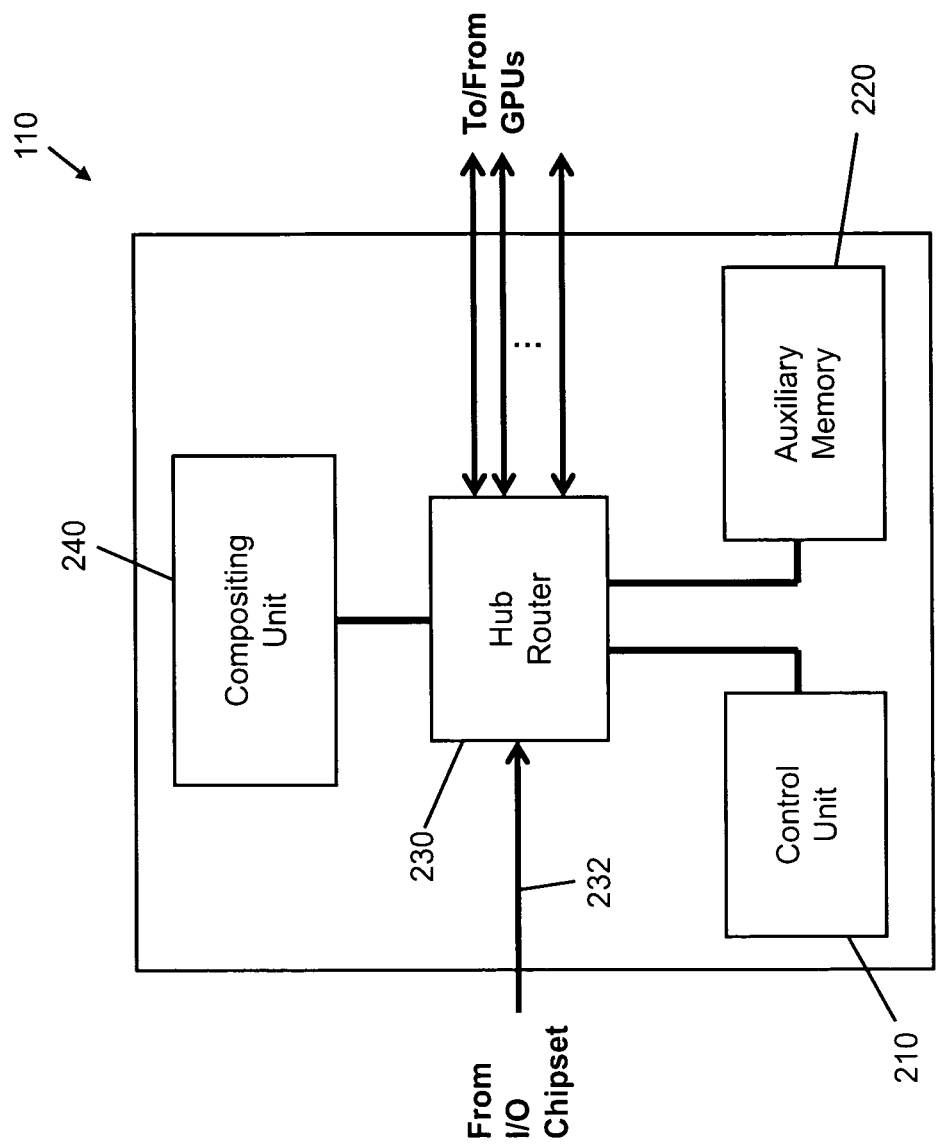
FIG. 2 is a block diagram of Hardware Hub components, according to an embodiment of the present invention.

Reference is now made to FIG. 2, which discloses the components of the Hardware Hub 110, according to an embodiment the present invention. Control Unit 210, accepts proprietary commands from the Software Hub Driver over the bus, and accordingly controls the other units. Hub Router 230 routes polygonal data and graphic command stream from left to right, routs pixel data from right to compositing unit, and routs compositing results to the right. Compositing Unit 240 performs various compositing schemes according to parallelization mode. Auxiliary Memory block 220 is used for storing intermediate processing results of one or more GPUs, data required for composition and transferring the processed data for display.

The Hardware Hub 110 utilizes its units according to parallelization modes: an Object division mode, an Image division mode, a Time division mode. These modes are adaptively handled by the Hardware Hub 110 according to application needs.

Figure 3:
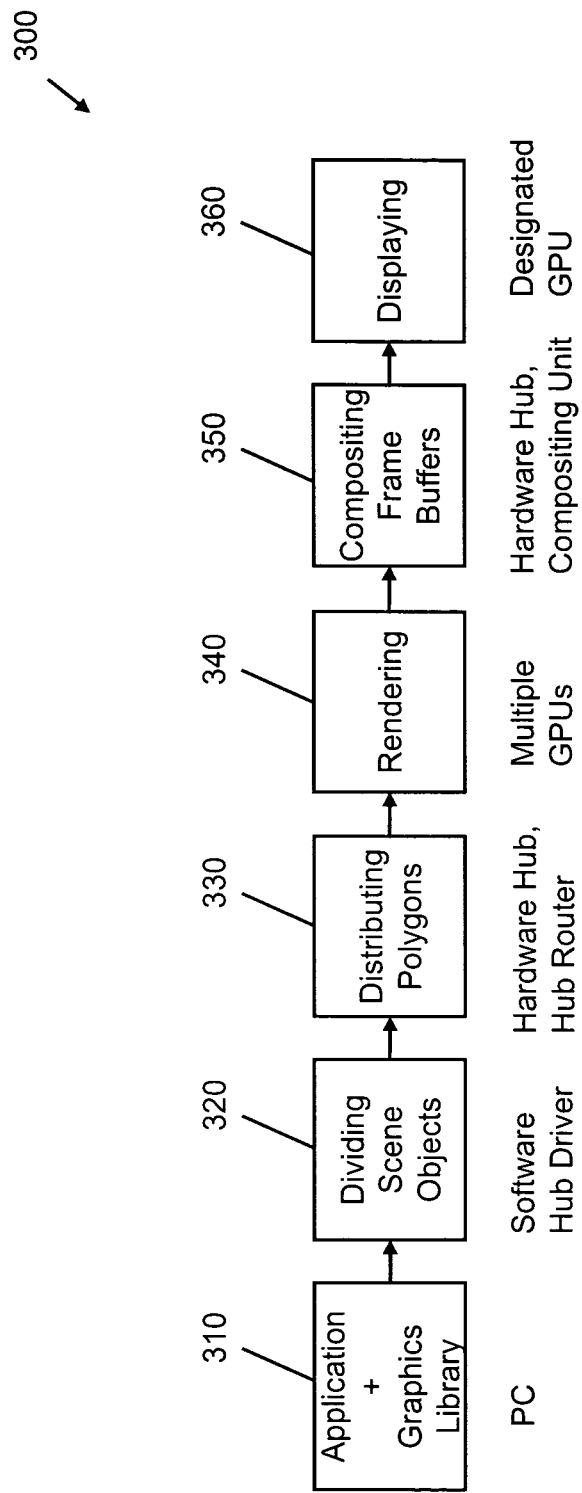
FIG. 3 is a block diagram of Object division parallelization mode, according to an embodiment of the present invention.

FIG. 3 discloses the operation of the Object division parallelization mode, according to an embodiment the present invention. The CPU executes the 3-D graphic application 310, which along with standard graphic library, generates a stream of graphic operations and polygonal data. They are typically organized in data blocks either as Display List, Vertex Array or free polygons, which are polygons that are neither organized in Display List nor in Vertex Array. The Software Hub Driver at step 320 marks the polygonal data and graphic commands for distribution between multiple GPUs, in a way that the overall load is balanced. The marked data is forwarded to Hardware Hub. At step 330 it is distributed via the Hub Router to multiple GPUs. After the rendering process in GPUs at step 340 is accomplished, the Frame Buffers are retrieved and forwarded via the Hub Router to the compositing unit at step 350. Here the frame buffers are composited to a single frame buffer, which is forwarded to the designated GPU for display. The single frame buffer is displayed at step 360.

Figure 4:
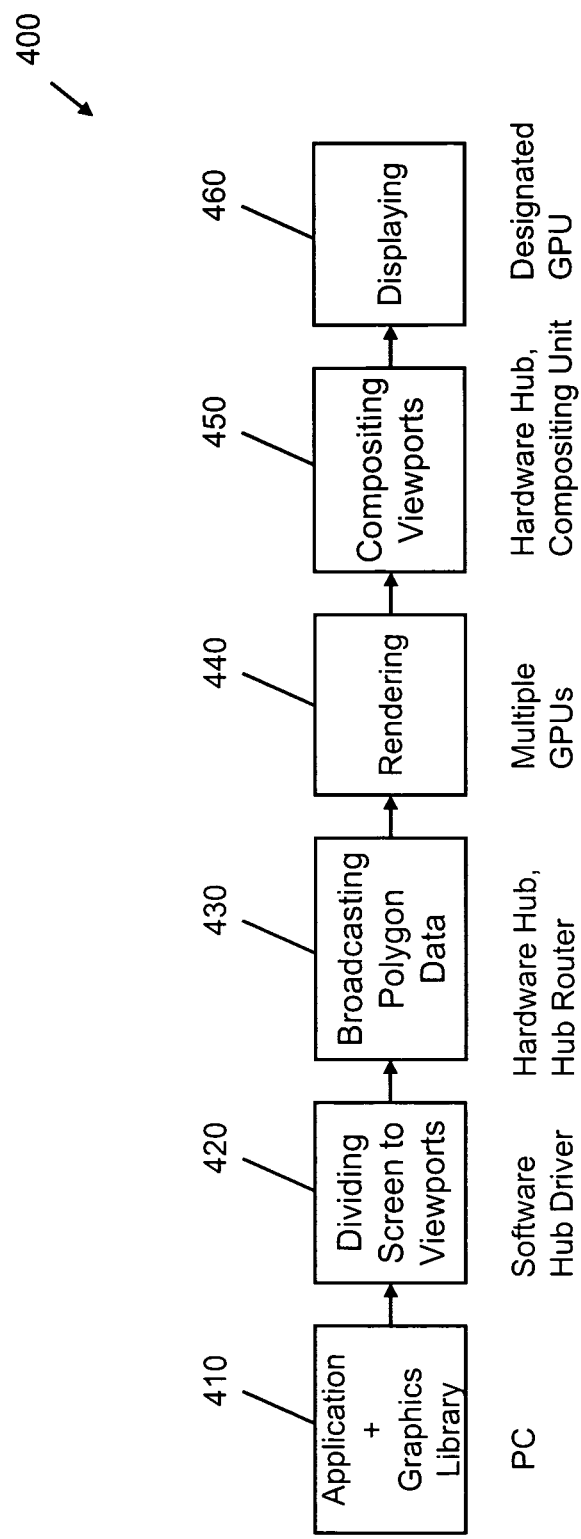
FIG. 4 is a block diagram of Image division parallelization mode, according to an embodiment of the present invention.

FIG. 4 discloses the operation of the Image division parallelization mode, according to an embodiment the present invention. In this mode the Software Hub Driver assigns different viewports to GPUs in order to subdivide the screen between them. The viewports aspects are set according to load balancing considerations, to keep the overall GPU load evenly balanced. In step 420, the entire polygonal data and graphic commands are moved to the Hub Router at Hardware Hub, and they are transmitted at step 430 to multiple GPUs. All GPUs receive the same data. After rendering at step 440, the partial frame buffers are brought to compositing unit in Hardware Hub for the full image creation at step 450, and then this image is moved out to designated GPU for display. The full image is displayed at step 460.

Figure 5:
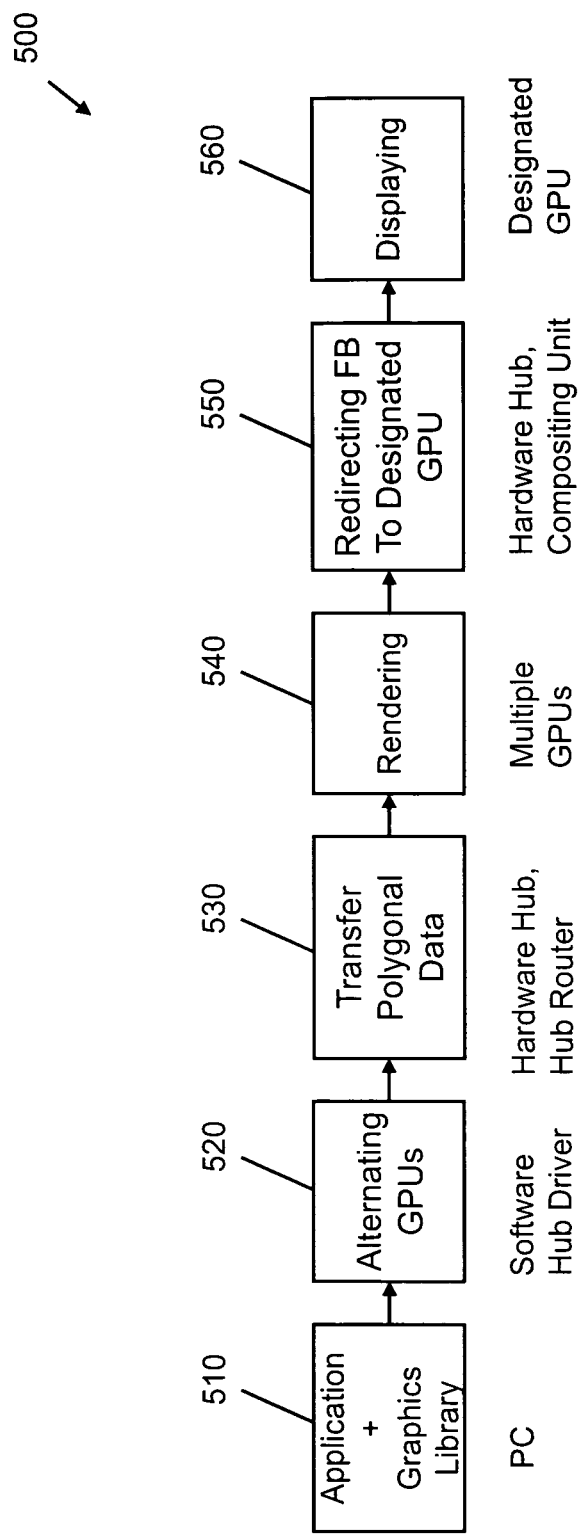
FIG. 5 is a block diagram of Time division parallelization mode, according to an embodiment of the present invention.

FIG. 5 discloses the operation of the Time division parallelization mode, according to an embodiment the present invention. In time division the processing of each frame takes N frame time units, while N GPUs (or N clusters of GPUs) are participating. The entire amount of polygons is forwarded to each GPU, for rendering. At each frame time unit, the Software Hub Driver redirects the polygonal data and graphic commands at step 530 to a cluster of GPUs at a time, while alternating between them. The data is transferred to the above cluster of GPUs via the Hub Router, rendered in the GPUs at step 540, and then the resulting frame buffer at step 550 is redirected via Hub Router to the designated GPU for display. All GPUs are coordinated by Software Hub Driver to create a continuous sequence of frames. The resulting frame buffer is displayed at step 560.

The Hardware Hub competence is its scaling technology: Architecture and cluster of proprietary processes devoted to scale existing GPUs performance in PC based systems, by enabling the use of multiple GPUs in parallel on the level of chip, card or chip IP (Intellectual Property) core, and handling multiple bus paths between the CPU and GPU. The technology achieves linear increase in performance. It is invariant to a graphics vendor and also it is transparent to an application. In the present invention, the graphic pipeline bottlenecks of vertex processing, fragment processing and bus transfer are completely and intelligently resolved. As bottlenecks may shift between frames, the Hardware Hub is designed with a smart real-time feedback system between the Control Unit 210, disclosed in FIG. 2, and Software Hub Driver 123, disclosed in FIG. 1, by means of the bus, utilizing the different parallelization modes to overcome different bottlenecks and maintain maximum performance at the frame level.

The Software Hub Driver

Figure 6:
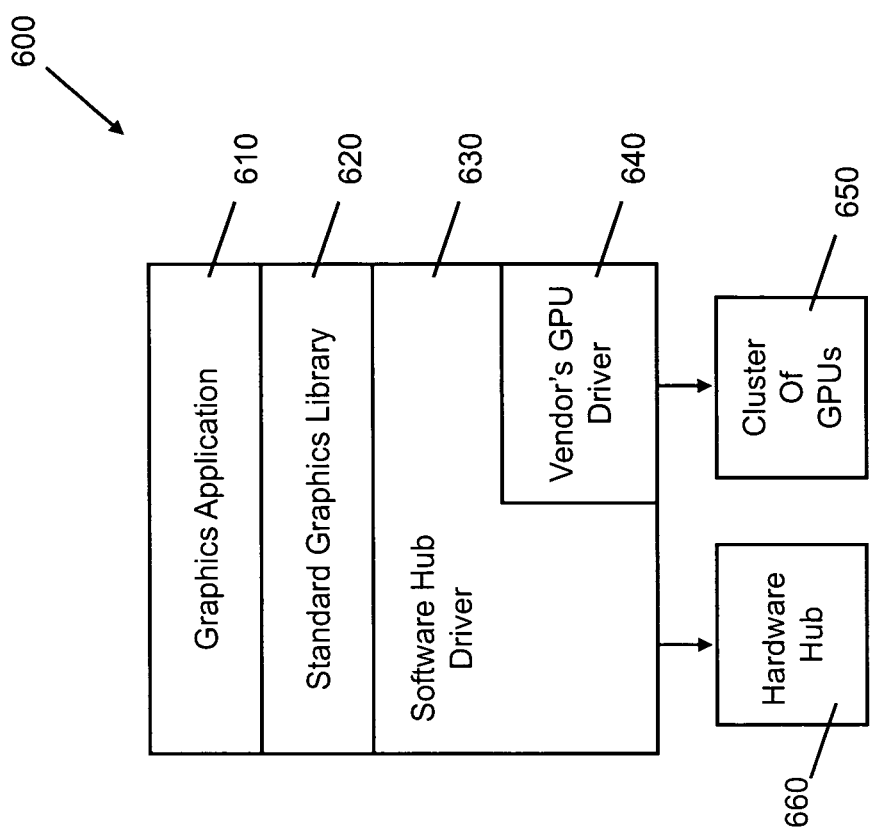
FIG. 6 is a schematic block diagram of a possible integration of the Software Hub Driver into the operating system environment, according to an embodiment of the present invention.

The Software Hub Driver is a software package residing in the PC and coexisting with computer's operating system, standard graphic library, application and Vendor's GPU Driver. FIG. 6 is a schematic block diagram of a possible integration of the Software Hub Driver 630 into the operating system environment according to an embodiment the present invention. Next to graphic application block 610 there is standard graphic library block 620. The Software Hub Driver 630 is located beneath the standard graphic library 620, intercepting the graphic command and data stream on the way to the Vendor's GPU Driver 640. The Software Hub Driver 630 also controls the Hardware Hub 660.

Figure 7:
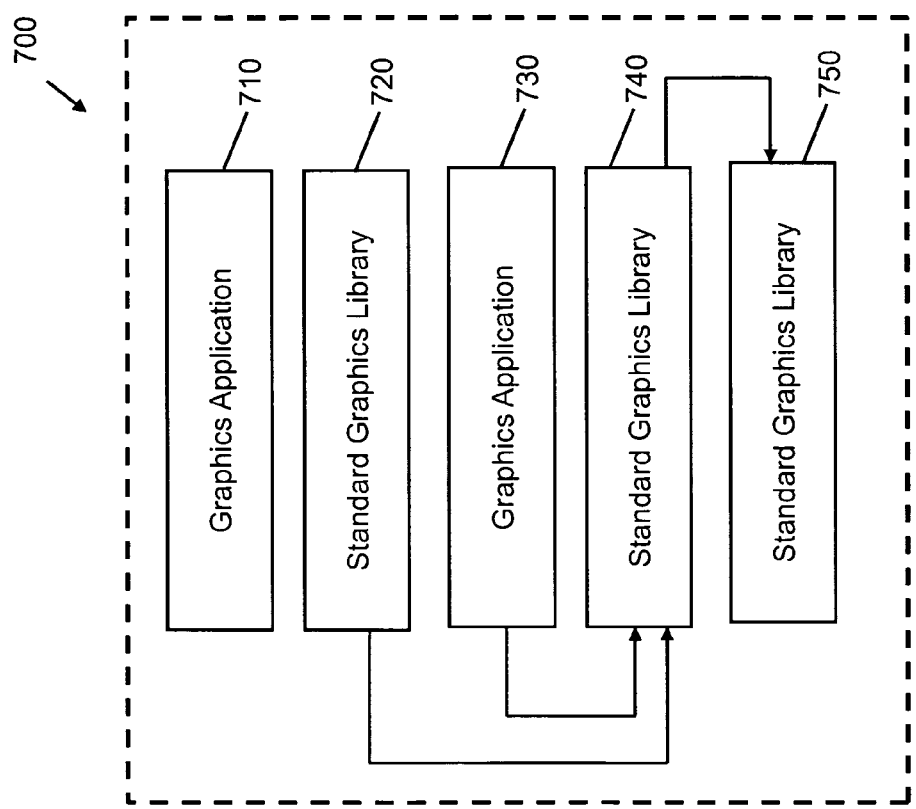
FIG. 7 is a functional block diagram presenting the main tasks of the Software Hub Driver, according to an embodiment of the present invention.

FIG. 7 is a functional block diagram presenting the main tasks of the Software Hub Driver, according to an embodiment the present invention. OS interface and Utilities block 710 is responsible for interception of the graphic commands from the standard graphic library, forwarding and creating graphic commands to Vendor's GPU Driver, controlling the Hardware Hub, registry and installation, OS services and utilities. State Monitoring block 720 is responsible for maintaining consistency of graphic machine states across the GPUs, based on the input graphic commands stream. Application and graphic resources analysis block 730 is responsible for the application observation-estimating the type of graphic load and bottleneck in the current application graphic context, graphic resources (GPUs) load estimation for load balance based on graphic commands stream and time measurements, handling the feedback from GPUs in regard to load balancing. Parallelism policy management block 740 is based on load analysis. All parallelization modes, which are the Object division mode, Image division mode and Time division mode, are combined together in order to achieve best performance and optimal load handling. Parallelization policy is based on the analysis of the load, and it must preserve the state of the graphic system at all relevant GPUs across the electronic circuit or chip. For example, changing of a state by adding a new light source in the scene at some time point, must affect all subsequent polygons at different GPUs. Parallelism policy management block 740 is responsible for the interpretation of the policy for specific manipulation in graphic functions. Distributed graphic functions control block 750 is responsible for modification of graphic command and data stream based on the parallelization policy.

Object Division Decomposition Process

Object division is a well-known concept, but data decomposition (partition of data and graphic commands between GPUs), while being also a known concept, has not been applied yet effectively, as it imposes various great difficulties. These difficulties are handled successfully by a proposed process and its implementation, according to the present invention.

The decomposition, and more importantly, the composition, must be accurate and efficient. Certain operations must be performed in the order they are submitted by the application. For example, in case of semi-transparency, the commands and polygon stream must keep a certain order for creating a correct graphic result.

Intelligent decomposition of data and graphic commands is needed, preserving the basic features of graphic libraries as state machines, and complying with the graphic standards. The proposed decomposition process, according to the present invention, is performed by the Software Hub Driver. CPU runs the 3-D graphic application, generating flow of graphic commands and data. They are typically organized in blocks, such as Display Lists or Vertex Arrays, stored in the system memory.

According to the present invention, the Software Hub Driver, running in the CPU, decomposes the set of scene polygons (or vertices). Their physical distribution is performed by the Hardware Hub.

The polygons are rendered in the GPU, while maintaining the resulting Frame Buffer in local memory. All FBs are transferred, via Hub Router, to compositing unit in Hardware Hub, to be merged into single FB. Finally, the composited FB is forwarded for display.

The Software Hub Driver carries out the following process of distribution of the polygons between the multiple GPUs. It is assumed, that the regular way the graphic application works, remains unchanged. Per frame, a typical application generates a stream of graphic calls that includes blocks of graphic data; each block consists of a list of geometric operations, such as single vertex operations or buffer based operations (vertex array). Typically, the decomposition process splits the data between GPUs preserving the blocks as basic data units. Geometric operations are attached to the block(s) of data, instructing the way the data is handled. A block is directed to designated GPUs. However, there are operations belonging to the group of Blocking Operations, such as Flush, Swap, Alpha blending, which affect the entire graphic system, setting the system to blocking mode. Blocking operations are exceptional in that they require a composed valid FB data, thus in the parallel setting of the present invention, they have an effect on all GPUs. Therefore, whenever one of the Blocking operations is issued, all the GPUs must be synchronized. Each frame has at least 2 blocking operations: Flush and Swap, which terminate the frame.

Figure 8:
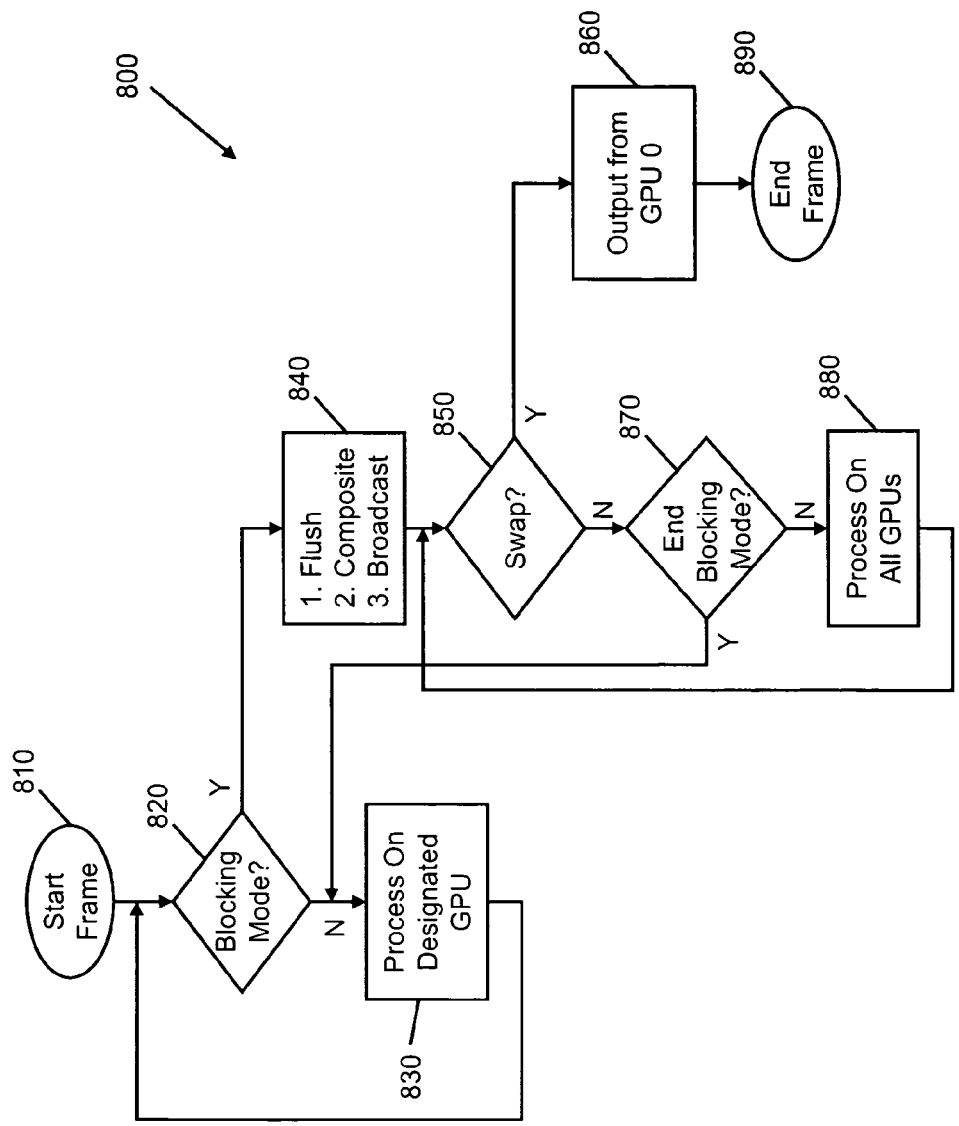
FIG. 8 is a flow chart presenting an process for distribution of the polygons between the multiple GPUs, according to an embodiment of the present invention.

FIG. 8 is a flow chart presenting the process for distribution of the polygons between the multiple GPUs, according to an embodiment the present invention. The frame activity starts with distributing blocks of data between GPUs. Each graphic operation is tested for blocking mode at step 820. In a regular (non-blocking) path, data is redirected to the designated GPU at the step 830. This loop is repeated until a blocking operation is detected.

When the blocking operation is detected, all GPUs must be synchronized at step 840 by at least the following sequence:—performing a flush operation in order to terminate rendering and clean up the internal pipeline (flushing) in GPU;—performing a composition in order to merge the contents of FBs into a single FB; and—transmitting the contents of said single FB back to all GPUs, in order to create a common ground for continuation.

The Swap operation activates the double buffering mechanism, swapping the back and front color buffers. If Swap is detected at step 850, it means that a composited complete frame must be terminated at all GPU, except GPU0. All GPUs have the final composed contents of a FB designated to store said contents, but only the one connected to the screen (GPUO) displays the image at step 860.

Another case is operations that are applied globally to the scene and need to be broadcasted to all the GPUs. If one of the other blocking operations is identified, such as Alpha blending for transparency, then all GPUs are flushed as before at step 840, and merged into a common FB. This time the Swap operation is not detected (step 850), and therefore all GPUs have the same data, and as long as the blocking mode is on (step 870), all of them keep processing the same data (step 880). If the end of the block mode is detected at step 870, GPUs return working on designated data (step 830).

Adaptive Handling of Graphic Load by Combining Three Division Methods

In addition, the present invention introduces a dynamic load-balancing technique that combines the object division method with the image division and time division methods in image and time domains, based on the load exhibits by previous processing stages. Combining all the three parallel methods into a unified framework dramatically increases the effectiveness of our invention.

Parallel processing is implemented by a pipeline, such as any common GPU allows the data to be processed in parallel, in time, image and object domains. The processing performed on the graphical processing system, either in parallel on multi-GPU or sequential, results in a sequence of complete raster images stored in a frame buffer, and sent to the display unit. These images are referred as frames in short. A frame consists of fragments. A fragment is an extended pixel stored in memory, which consists of attributes such as color, alpha, depth, stencil, etc. When processing is performed in parallel in the time domain, typically each GPU is responsible for the production of a complete frame. In the other two domains, which are the image and object domains, all GPU operate in parallel to produce a single frame. Screen-space parallel-processing implies that each GPU renders a subset of the fragments of each frame, and object parallel-processing implies that the input data for each frame, in particular the geometric data (e.g., the polygon set representing the scene) is distributed between the multiple GPUs.

Each one of three domains (time, image and object domains) has advantages and disadvantages. The effectiveness of each discipline is a dynamic function based on input data. Moreover, in many cases no single discipline is superior. In these cases a combination of two or even all the three disciplines may yield the most optimum results.

The present invention provides a parallel-processing system for three-dimensional data. It provides a novel process for object parallel-processing that consists of efficient decomposition of the data between the different GPU, and then the composition of the frames produced on the various GPUs into a final frame ready to be rendered.

The present invention provides a method to integrate all the three parallel modes dynamically into a unified framework to achieve maximum load balancing. At each frame, the set of available GPUs can be reconfigured based on the time it took to render the previous frames, and the bottlenecks exhibited during the processing of these frames.

Figure 9:
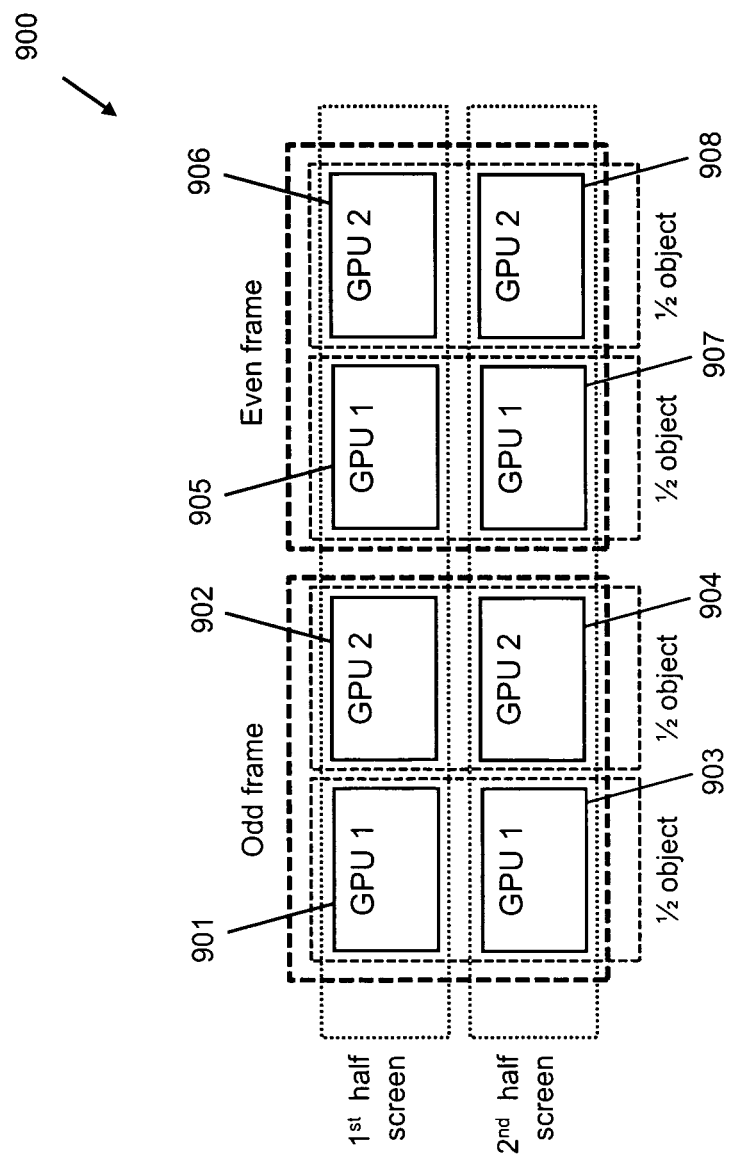
FIG. 9 discloses a sample configuration of the system, employing 8 GPUs, according to an embodiment of the present invention.

FIG. 9 discloses a sample configuration of the system, employing eight (8) GPUs, according to an embodiment of the present invention. According to the above sample configuration, a balanced graphic application is assumed. The GPUs are divided into two groups for time division parallelism. GPUs indexed with 1, 2, 3, and 4 are configured to process even frames and GPUs indexed with 5, 6, 7, and 8 are configured to process odd frames. Within each group, two GPU subgroups are set for image division: the GPUs with the lower indexes (1, 2 and 5, 6 respectively) are configured to process half of the screen, and the high-indexed GPU (3, 4 and 7, 8 respectively) are configured to process the other half. Finally, for the object division, GPUs indexed with 1, 3, 5 and 7 are fed with half of the objects, and GPUs indexed with 2, 4, 6 and 8 are fed with the other half of the objects.

If at some point the system detects that the bottlenecks exhibited in previous frames occur at the raster stage of the pipeline, it means that fragment processing dominates the time it takes to render the frames and that the configuration is imbalanced. At that point the GPUs are reconfigured, so that each GPU will render a quarter of the screen within the respective frame. The original partition for time division, between GPUs 1, 2, 3, 4 and between 5, 6, 7, 8 still holds, but GPU 2 and GPU 5 are configured to render the first quarter of screen in even and odd frames respectively. GPUs 1 and GPU 6—the second quarter, GPU 4 and GPU 7—the third quarter, and GPU 3 and GPU 8—the forth quarter. No object division is implied.

In addition, if at some point the system detects that the bottleneck exhibited in previous frames occurs at the geometry stage of the pipe, the GPUs are reconfigured, so that each GPU will process a quarter of the geometrical data within the respective frame. That is, GPU 3 and GPU 5 are configured to process the first quarter of the polygons in even and odd frames respectively. GPU 1 and GPU 7—the second quarter, GPU 4 and GPU 6—the third quarter and GPU 2 and GPU 8—the forth quarter. No image division is implied.

It should be noted, that taking 8 GPUs is sufficient in order to combine all three parallel modes, which are time, image and object division modes, per frame. Taking the number of GPUs larger than 8, also enables combining all 3 modes, but in a non-symmetric fashion. The flexibility also exists in frame count in a time division cycle. In the above example, the cluster of 8 GPUs was broken down into the two groups, each group handling a frame. However, it is possible to extend the number of frames in a time division mode to a sequence, which is longer than 2 frames, for example 3 or 4 frames.

Taking a smaller number of GPUs still allows the combination of the parallel modes, however the combination of two modes only. For example, taking only 4 GPUs enables to combine image and object division modes, without time division mode. It is clearly understood from FIG. 9, while taking the group of GPU1, GPU2, GPU3 and GPU4, which is the left cluster. Similarly, the group of GPU1, GPU2, GPU5 and GPU6, which is the upper cluster, employs both object and time division modes. Finally, the configuration of the group of GPU2, GPU4, GPU5 and GPU6, which is the middle cluster, employs image and time division modes.

It should be noted, that similarly to the above embodiments, any combination between the parallel modes can be scheduled to evenly balance the graphic load.

It also should be noted, that according to the present invention, the parallelization process between all GPUs may be based on an object division mode or image division mode or time division mode or any combination thereof in order to optimize the processing performance of each frame.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A multi-GPU graphics processing subsystem to work with a computing system having a CPU, said multi-GPU graphics processing subsystem comprising:
   a plurality of GPUs divided into N sets of GPUs, each GPU taking N frame time units to render a full frame of graphics data, one of said GPUs is a display-designated GPU that is connectable to a display and the remaining GPUs are non-display-designated GPUs; and
   a hardware hub interfaced between said CPU and said plurality of GPUs, wherein said hub has a router to alternately direct an incoming frame of a sequence of frames of geometric data and graphics commands to a different one of said N sets for rendering of said frames into image pixel data and to alternately redirect rendered frames to said display-designated GPU for display.

2. The multi-GPU graphics subsystem of claim 1, wherein the hardware hub comprises a separate chip.

3. The multi-GPU graphics subsystem of claim 2, wherein said hardware hub is interfaced with the computer system by a PCI express bus.

4. The multi-GPU graphics subsystem of claim 1, wherein the hardware hub comprises a part of an I/O chipset.

5. The multi-GPU graphics subsystem of claim 4, wherein said hardware hub is interfaced with a CPU chip by a proprietary bus.

6. The multi-GPU graphics subsystem of claim 4, wherein said hardware hub is interfaced with said plurality of GPUs by a PCI express bus.

7. The multi-GPU graphics subsystem of claim 4, wherein said hardware hub is interfaced with said plurality of GPUs by a PCI express bus.

8. The multi-GPU graphics subsystem of claim 1, wherein said hardware hub is part of a CPU chip.

9. The multi-GPU graphics subsystem of claim 8, wherein said hardware hub is interfaced with said plurality of GPUs by a PCI express bus.

10. A method of processing data within a multi-GPU graphics subsystem working with a computing system having a CPU, said method comprising the steps of:
   (a) providing a plurality of GPUs divided into N sets of GPUs, each GPU taking N frame time units to render a full frame of graphics data, wherein one of said GPUs is a display-designated GPU that is connectable to a display and the remaining GPUs are non-display-designated GPUs; and
   (b) alternately directing an incoming frame of a sequence of frames of geometric data and graphics commands to a different one of said N sets for rendering of said frames into image pixel data and alternately redirecting rendered frames to said display-designated GPU for displaying.

* * * * *